Aug. 18, 1942.  L. J. HENGESBACH  2,293,390
SPRAY NOZZLE
Filed May 18, 1939    2 Sheets-Sheet 1

INVENTOR.
LEO J. HENGESBACH
BY Saynell and Wessler
ATTORNEYS

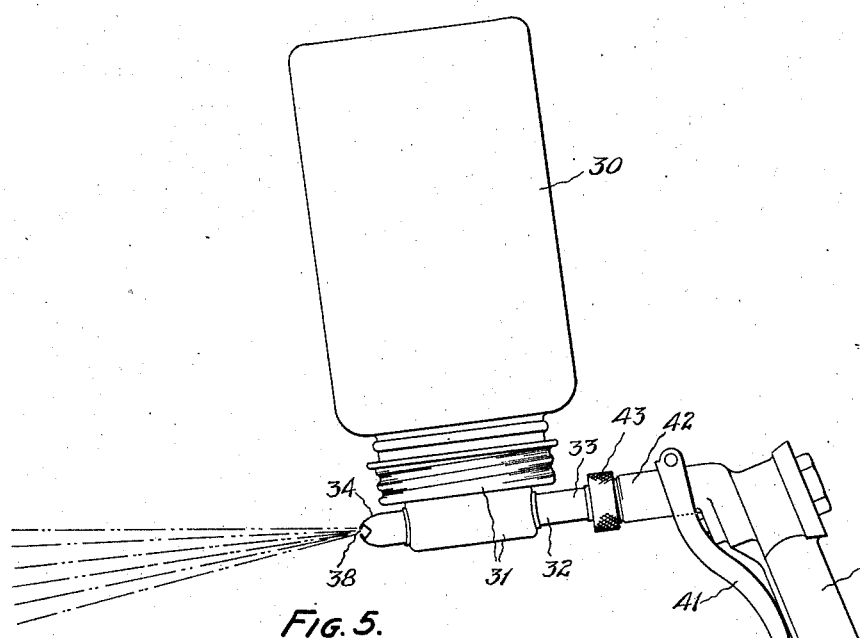
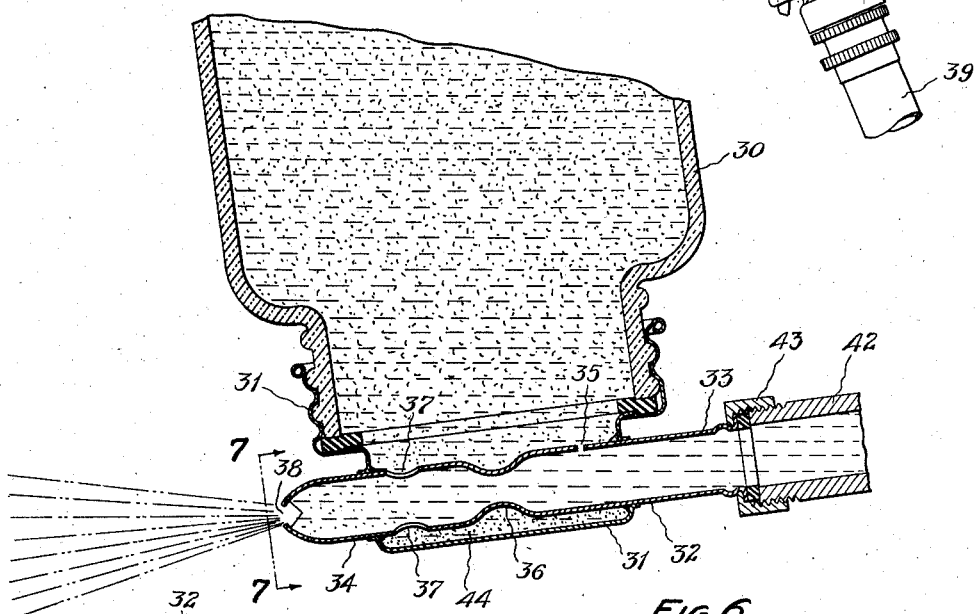
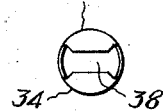

Patented Aug. 18, 1942

2,293,390

UNITED STATES PATENT OFFICE 2,293,390

SPRAY NOZZLE

Leo J. Hengesbach, East Cleveland, Ohio, assignor, by direct and mesne assignments, to Molded Specialties, Inc., Cleveland, Ohio, a corporation of Ohio Application May 18, 1939, Serial No. 274,376

3 Claims. (Cl. 299—84)

The invention relates to spraying means, and particularly to improved means of this character designed to effect the spraying of a solution of fertilizer of uniform definite strength. The invention includes an improved nozzle structure which is formed in a cap-like member adaptable to form a cover for a dry fertilizer storage container, such as a Mason jar, in which the dry fertilizer is uniformly mixed with water, and the solution forced from the jar and then sprayed from the nozzle with additional water.

The improvements in spraying means of this character are directed to the economical and simple structure thereof, their convenient operation for periodic plant and lawn feeding, and the certainty of maintaining the desired strength of solution during the spraying, without any valve or other adjustment or moving parts, and irrespective of the water pressure or the amount of dry fertilizer contained in the storage receptacle.

Other improvements will hereinafter appear in the following description, by reference to the accompanying drawings, illustrating certain forms of spraying devices embodying the improvements.

In said accompanying drawings:

Figure 5 is an elevation, corresponding to Figure 1, but particularly directed to a form of the improved spraying means adapted for use with a fertilizer which has a material amount of water-insoluble content;

Figure 6 is a fragmentary vertical section, upon an enlarged scale, of the spraying means shown in Figure 5; and Figure 7 is an elevation of a detail, taken from the plane indicated by the line 7—7, Figure 6.

Figure 1:
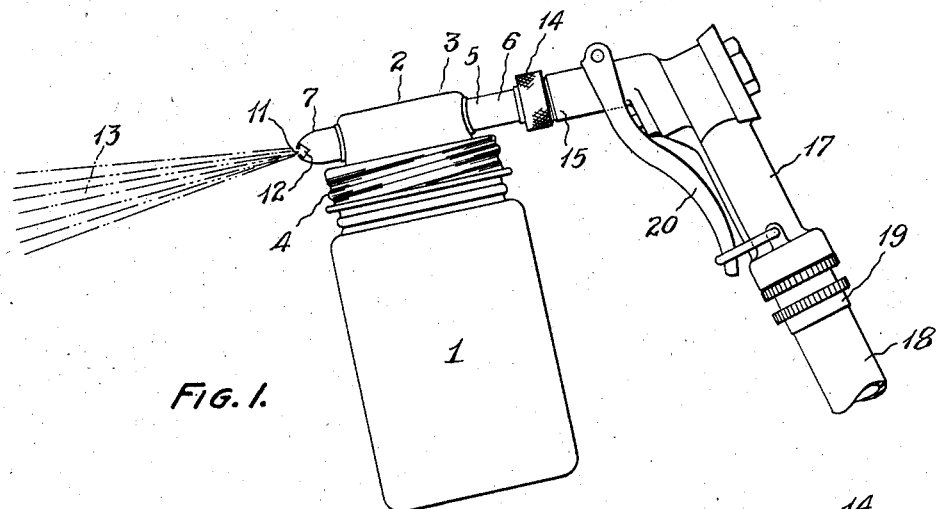
Figure 1 is an elevation of the improved spraying means, together with an elevation of a certain type of faucet serving to supply controlled water to the improved nozzle, the spraying means herein shown being particularly directed to a form thereof for use with a fertilizer which is substantially completely water soluble.
Figure 2:
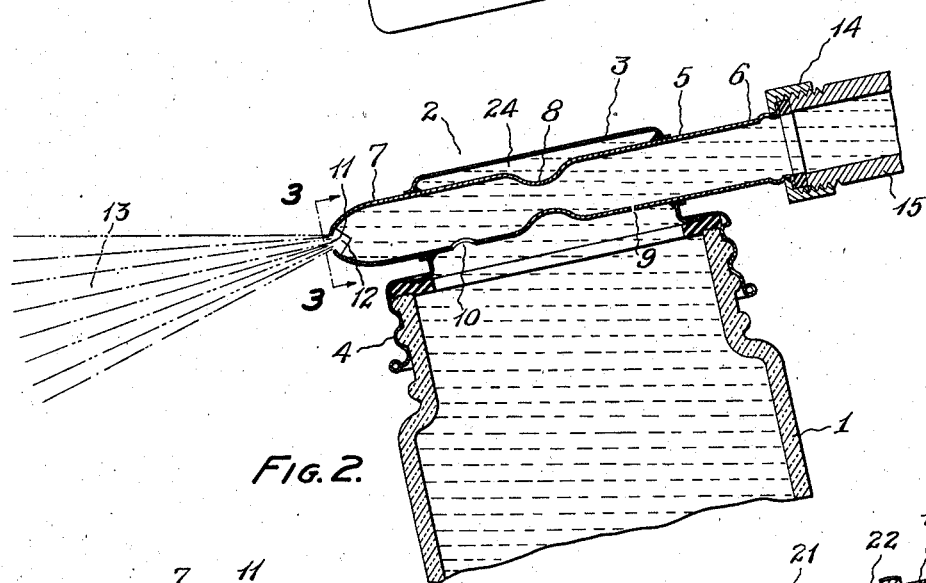
Figure 2 is a fragmentary vertical section, upon an enlarged scale, of the elements shown in Figure 1.
Figure 3:
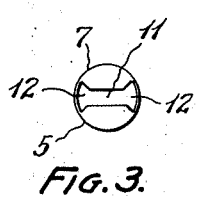
Figure 3 is an elevation of a detail, taken from the plane indicated by the line 3—3, Figure 2.

Referring to the accompanying drawings, in which the same parts are indicated by the same respective numbers in the several views, and first referring to Figures 1, 2, and 3, the improved spraying means comprise a suitable receptacle 1, such as the well-known Mason jar, herein shown as of one-pint capacity, into which the fertilizer designed to be spread is charged in a dry condition, and from which it is designed to be discharged as a water solution by the improved nozzle 2. A storage receptacle is used of the capacity suitable for servicing a given area of lawn or garden. The showing in Figure 1 presumes that a fertilizer is utilized which is substantially completely soluble in water, so that the receptacle 1 can be utilized in usual upright condition without any particular amount of sediment or insoluble fertilizer content collecting upon the bottom of the receptacle 1.

The improved nozzle structure 2 comprises a cap-like member 3 having means for attachment to the receptacle 1, such as a threaded flange 4 for engagement with the usual threaded top portion of a Mason jar, the cap 3 thus forming a cover for the receptacle. The nozzle structure 2 further comprises a tube 5 passed through the cap 3 from side to side and extended outwardly of the cap 3 at its two ends, so as to provide an inlet end 6, for connection to the water supply, and a discharge end 7. Both ends of the tube 5 are of substantially equal water-passing capacity, and uniformly so throughout their lengths, and are connected by an intermediate tube portion 8 of restricted water-passage capacity, forming, in effect, a throat-like connecting member between the end portions 6 and 7. The respective water-passage capacities of the inlet portion 6 and the throat-like intermediate portion 8 induce a differential in pressure, so that, if means are provided for entrance of water into the interior of the receptacle 1, water will enter such receptacle interior under pressure. Such means for the entrance of water under pressure into the receptacle interior is afforded by a minute port 9 formed in the wall of the inlet nozzle portion 6. Compared with the water-passing capacity of the throat-like nozzle portion 8, this port 9 is very minute, the degree of minuteness depending upon the desired strength of the sprayed fertilizer solution. There is a quite close definite relation between the water-passing capacities of the port 9 and the throat-like portion 8, since the relative sizes of the port 9 and the throat-like portion 8 determine the concentration of the solution. It is assumed that this concentration should be well short of the limits that would streak or burn the foliage. Of course, these limits are different for different fertilizers. For instance, in Figures 1, 2, and 3, it is assumed that the improved structure is being used to spray a solution of sulphate of ammonia with a given nitrogen content which is the major burning factor in sulphate of ammonia. Under these conditions, the diameter of the port 9 is substantially .029 inch, it being assumed that the diameter of the restricted throat-like portion 8 is substantially seven-thirty-seconds inch, and that the diameter of the main two portions 6 and 7 is seven-sixteenths inch. Although, under the conditions stated, the water pressure is immaterial, other than that the lower the pressure the longer time it takes to empty the jar of its dry sulphate of ammonia content, at fifty pounds water pressure, the pint jar of sulphate of ammonia (approximately sixteen ounces) is emptied in from ten to eleven minutes, and the solution sprayed is in substantially the proportion of sixteen ounces of sulphate of ammonia to thirty-two gallons of water. Furthermore, it is not necessary to measure the amount of sulphate of ammonia accurately when loading the jar 1, since the strength of solution, for which the port 9 and the throat-like portion 8 are calibrated, is maintained substantially the same, no matter how much sulphate of ammonia is in the jar 1.

Some of the water passing inwardly through the inlet 6 is diverted into the jar 1 as a powerful jet and induces great agitation in the jar and forces out a uniform amount per unit time of the sulphate of ammonia therein. The dry sulphate of ammonia in the jar 1 takes up a great amount of water and is forced out of the jar 1 in solution form.

For the escape of the fertilizer from the jar 1, a comparatively large port 10 is formed in the wall of the discharge portion 7 of the tube 5, the size of this port 10 being immaterial, provided it accommodates the desired discharge, its exact size affecting only the type of stream which is discharged from the nozzle discharge portion 7. This desired discharge through the outlet port 10 is affected by the type of fertilizer being dispensed, some being feathery or fluffy, even when dispensed with water, and some otherwise, so that the size of the outlet 10 is correspondingly controlled. The actual size of the comparatively large port 10, shown in Figure 2, is substantially three-sixteenths inch diameter. The solution forced out through the port 10 is mingled with primary water passing through the throat-like nozzle portion 8. The actual mouth of the discharge portion 7 is of any desired configuration, but, in the form shown in Figure 3, is a centrally elongated opening 11 having flared end portions 12, whereby a wide fan-like spray 13, Figure 2, is discharged from the tube portion 7.

It is assumed that the jar 1 of Figures 1 and 2 is a pint jar. Such an amount of dry sulphate of ammonia is sufficient to cover from three hundred to four hundred square feet of lawn at a concentration of solution which is well short of the limits at which streaking or burning of the grass would occur. As is well known to those in the trade, such streaking or burning will not occur, from the use of sulphate of ammonia, unless the concentration thereof in solution is substantially greater than one ounce to two gallons of water. The use of the improved spray nozzle having the proportionate port 9 and throat-like portions 8 that have been described distributes a sulphate of ammonia solution from 0.33 ounce per gallon of water to 0.45 ounce per gallon of water, and these figures indicate the full spread in concentration, irrespective of whether the storage jar is full or partly full or substantially empty. When the fertilizer is entirely dispensed, the apparatus acts as an ordinary water sprayer and serves as a follow-up fertilizer soaking device.

The inlet tube portion 6 is connected to any suitable source of water under pressure, and by any suitable means. In Figures 1 and 2, the improved spray nozzle is connected by its running threaded collar 14 with the discharge end 15 of a faucet structure 17, disclosed in U. S. Patent No. 2,072,555, the inlet end of said faucet structure being connected by a coupling 19 with the discharge end of a garden hose 18. This intermediate connecting faucet structure 17 is formed with a trigger control 20 actuating a valve within the structure 17 and controlling passage of water through the latter, so that it is not necessary, in order to control the fertilizer spray, to travel back and forth to the place of the usual control of the water, such as the ordinary house sill-cock.

Figure 4:
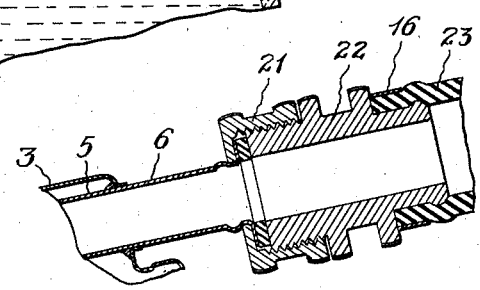
Figure 4 is a fragmentary axial section, illustrating a direct connection between the improved spraying means and an ordinary garden hose.

In Figure 4, a form of connection is shown in which the outer end of the inlet tube portion 6 is directly connected by its threaded collar 21 with one end of a hose coupling 22 forming the outer end portion of a garden hose 23 within which it is seated and to which it is tightly secured by a ferrule 16.

It will be noted that the tube 5 is disposed somewhat below the top of the cap 3, thus forming a chamber 24, Figure 2, between the cap top and the tube 5. This chamber 24 affords an important auxiliary advantage in the improved nozzle structure, since it serves as an air pocket or a suds area, thus eliminating any irregularity in, or impediment to, the uniform fertilizer solution discharge, by reason of interfering air or suds.

Referring to the form of improved spraying means shown in Figures 5, 6, and 7, it is assumed that the dry fertilizer charged into the jar 30 is of a nature having considerable content not soluble in water. Therefore, the receptacle 30, which, in this case, is assumed to be of one-quart capacity, is used in inverted position, so that the sediment or indissolvable content of the fertilizer, will uniformly and constantly settle toward and into the cap 31 and be discharged in the spray, and thus be dispensed without there being accumulated a sufficient quantity thereof to block or restrict the discharge. One kind of commercial fertilizer having a considerable content of water-insoluble material is known under the trade-name of "Vigoro."

For purpose of illustrating suitable water-passing capacities of the calibrated inlet port and throat-like intermediate portion of the tube 32, when utilized with a fertilizer having harmful characteristics to a lesser degree than sulphate of ammonia, and having a considerable water insoluble content, and assuming that the inlet and outlet portions of the tube, 33 and 34, respectively, Figures 5 and 6, have a passage substantially seven-sixteenths inch diameter, the inlet port 35 is substantially .055 inch diameter, the throat-like portion 36 being substantially seven-thirty-seconds inch diameter. The outlet ports 37, of which two, diametrically-opposed, are shown, are each substantially one-quarter inch diameter. As before stated, the size of the outlet port 37 is not critical, but it is very materially greater than the diameter of the inlet port 35, and sufficient to readily pass the particular stored fertilizer in solution at such concentration and in such an amount that the proper amount of water with the given amount of fertilizer will be sprayed from the tube 32 in a given time. For the sizes given, the central elongated portion 38 of the discharge mouth of the nozzle is substantially five-thirty-seconds inch width. It has been assumed, with reference to the structures shown in Figures 5, 6, and 7, that a higher concentration of solution is safe, than that mentioned with reference to Figures 1, 2, and 3. Therefore, the diameter of the port 35 has been increased relative to the water-passage capacity of the throat-like member 36. It is also assumed that it is desired to spray a larger volume of the solution in a given time, under a given water pressure, so that the outlet port 37 and the discharge mouth 38 have been accordingly increased in size.

In Figures 5 and 6, the improved spraying means is shown connected to the end of an ordinary garden hose 39 by an intermediate faucet structure 40 having the valve control trigger 41 and whose discharge end 42 engages the running collar 43 of the spray nozzle.

Corresponding to the chamber 24 of the form of device shown in Figures 1 and 2, there is a chamber 44, in the form of device shown in Figures 5 and 6, disposed between the bottom of the cap 31 and the tube 32, and serving as a sediment area. It will be noted that one of the outlet ports 37 faces the chamber 44. This port 37 acts as a safety port, if the opposite port 37 becomes clogged. Also, in that event, a back pressure is induced which causes the solution to swirl around the tube 32 and clear that outlet port 37 which faces the interior of the receptacle 30.

What I claim is:

1. A spray nozzle comprising a cap-like member adaptable for attachment to a jar or other receptacle, a tube extended therethrough, said tube having an inlet for receiving exterior water and an opening discharging exteriorly of the member, said tube having an intermediate restricted portion, the tube wall being formed with a small port inducing water discharge therefrom as a powerful jet, said port facing the open end of the member and upon the inlet side of said restricted portion, the latter being calibrated as to its water-passing capacity with the water-passing capacity of the small port and having a water-passing capacity greatly in excess of that of the small port, the tube wall being further formed with at least one comparatively large port facing the open end of the member upon the discharge side of the intermediate restricted portion.

2. A spray nozzle comprising a cap-like member adaptable for attachment to a jar or other receptacle, a tube extended therethrough, said tube having an inlet for receiving exterior water and an opening discharging exteriorly of the member, said tube having an intermediate restricted portion, the tube wall being formed with a small port inducing water discharge therefrom as a powerful jet, said port facing the open end of the member and upon the inlet side of said restricted portion, the latter being calibrated as to its water-passing capacity with the water-passing capacity of the small port and having a water-passing capacity greatly in excess of that of the small port, the tube being somewhat spaced from the closed side of the member so as to form a chamber in the member between the tube and the closed side, said chamber communicating upon opposed sides with the open end of the member, the tube wall being further formed with at least one comparatively large port facing the open end of the member upon the discharge side of the intermediate restricted portion.

3. A spray nozzle comprising a cap-like member adaptable for attachment to a jar or other receptacle, a tube extended therethrough, said tube having an inlet for receiving exterior water and an opening discharging exteriorly of the member, said tube having an intermediate restricted portion, the tube wall being formed with a small port inducing water discharge therefrom as a powerful jet, said port facing the open end of the member and upon the inlet side of said restricted portion, the latter being calibrated as to its water-passing capacity with the water-passing capacity of the small port and having a water-passing capacity greatly in excess of that of the small port, the tube wall being further formed with a plurality of comparatively large spaced ports upon the discharge side of the intermediate restricted portion, the member being formed with a chamber between its closed side and the tube, with which chamber at least one of the spaced ports communicates, and the other spaced ports communicating with the open end of the member, said chamber communicating with the open end of the member.

LEO J. HENGESBACH.